US005518512A

United States Patent [19]

Hibbard

[11] Patent Number: 5,518,512

[45] Date of Patent: May 21, 1996

[54] ABRASIVE COMPOSITES HAVING A CONTROLLED RATE OF EROSION, ARTICLES INCORPORATING SAME, AND METHODS OF MAKING AND USING SAME

[75] Inventor: Louis D. Hibbard, Eagan, Minn.

[73] Assignee: Minnesota Mining and Manufacturing Company, St. Paul, Minn.

[21] Appl. No.: 252,418

[22] Filed: Jun. 1, 1994

Related U.S. Application Data

[62] Division of Ser. No. 999,097, Dec. 31, 1992, Pat. No. 5,342,419.

[51] Int. Cl.$^6$ ....................................... B24D 3/02
[52] U.S. Cl. ....................................... 51/308
[58] Field of Search ........................... 51/293, 307, 308

[56] References Cited

U.S. PATENT DOCUMENTS

| | | | |
|---|---|---|---|
| 2,322,156 | 12/1941 | Oglesby | 51/298 |
| 2,534,805 | 12/1950 | Waterfield | 51/297 |
| 2,676,892 | 4/1954 | McLaughlin | 106/86 |
| 2,806,772 | 9/1957 | Robie | 51/296 |
| 2,958,593 | 11/1960 | Hoover et al. | 51/295 |
| 3,510,283 | 5/1970 | McGurran | 51/295 |
| 3,689,346 | 9/1972 | Rowland | 156/245 |
| 4,202,952 | 5/1980 | Onizawa | 525/374 |
| 4,318,766 | 3/1982 | Smith | 156/330 |
| 4,576,850 | 3/1986 | Martens | 428/156 |
| 4,588,419 | 5/1986 | Caul et al. | 51/295 |
| 4,642,126 | 2/1987 | Zador et al. | 51/295 |
| 4,644,703 | 2/1987 | Kaczmarek et al. | 51/401 |
| 4,652,274 | 3/1987 | Bloecher et al. | 51/298 |
| 4,735,632 | 4/1988 | Oxman et al. | 51/295 |
| 4,751,138 | 6/1988 | Tumeuy et al. | 428/323 |
| 4,773,920 | 9/1988 | Chasman et al. | 51/295 |
| 4,828,583 | 5/1989 | Oxman et al. | 51/293 |
| 4,871,376 | 10/1989 | DeWald | 51/298 |
| 4,903,440 | 2/1990 | Larson | 51/298 |
| 4,927,431 | 5/1990 | Buchanan et al. | 51/298 |
| 4,933,373 | 6/1992 | Moren | 521/99 |
| 4,985,340 | 6/1991 | Palazzotto et al. | 430/270 |
| 5,011,512 | 4/1991 | Wald et al. | 51/295 |
| 5,011,513 | 4/1991 | Zador et al. | 51/295 |
| 5,014,468 | 5/1991 | Ravipati et al. | 51/295 |
| 5,152,917 | 10/1992 | Pieper et al. | 51/295 |
| 5,256,170 | 10/1993 | Harmek et al. | 51/293 |
| 5,342,419 | 8/1994 | Hibbard | 51/308 |

FOREIGN PATENT DOCUMENTS

| | | |
|---|---|---|
| 109581 | 5/1984 | European Pat. Off. . |
| 257757 | 10/1987 | European Pat. Off. . |
| 306161 | 3/1989 | European Pat. Off. . |
| 306162 | 3/1989 | European Pat. Off. . |

OTHER PUBLICATIONS

*Encyclopedia of Polymer Science and Technology,* vol. 8, John Wiley & Sons, Inc. (1968) pp. 651–665.
"Clay Colloid Chemistry", pp. 64–71 (1977).
*Clays and Clay Materials,* vol. 39, No. 3, pp. 333–335 (1991).
Patent Abstract of Japan, vol. 15, No. 228(M–1123), 11 Jun. 1991.
Chemical Abstracts, vol. 93, No. 8, 25 Aug., 1980, Columbus, Ohio, US; abstract No. 78175a, "Effect of binder components on the properties of a diamond tool".

*Primary Examiner*—Deborah Jones
*Attorney, Agent, or Firm*—Gary L. Griswold; Walter N. Kirn; Doreen S. L. Gwin

[57] ABSTRACT

An abrasive composite is presented having a controller rate of erosion, the composite comprising abrasive particles dispersed in the binder, wherein the binder comprises an addition polymerized resin having clay particles dispersed therein. The abrasive composite may be adhered to various substrates, including paper, cloth, polymeric films, and nonwovens. The clay particles allow the binder, and thus the composite, to controllably erode upon abrasion of a workpiece, thus exposing fresh abrasive particles to the workpiece. Coatable compositions comprising clay particles dispersed in a binder precursor composition, and optionally containing abrasive particles, are also described, as well as methods of making and using the composites and articles.

8 Claims, No Drawings

ABRASIVE COMPOSITES HAVING A CONTROLLED RATE OF EROSION, ARTICLES INCORPORATING SAME, AND METHODS OF MAKING AND USING SAME

This is a division of application Ser. No. 07/999,097 filed Dec. 31, 1992, now U.S. Pat. No. 5,342,419.

BACKGROUND OF THE INVENTION

1. Field of the Invention

This invention pertains to an abrasive article comprising a plurality of abrasive particles and a clay-modified binder. The addition of the clay allows the binder to exhibit a controlled rate of erosion.

2. Background Art

Abrasive articles typically comprise a plurality of abrasive particles and a binder. In coated abrasives the binder is coated onto a backing, and the binder may comprise conventional make and size resins which bond abrasive particles to the backing, or the abrasive particles may be dispersed in a slurry which is coated onto a backing. In nonwoven abrasives, the binder bonds abrasive particles to the fibers of a nonwoven fibrous substrate.

In both coated and nonwoven abrasives, the binder may comprise a resinous adhesive (referred to hereinafter as simply "resin"), and optionally other additives, such as inorganic fillers. Examples of typical resins include phenolic resins, aminoplast resins, urethane resins, epoxy resins, and the like.

Typically, during the manufacture of a coated abrasive article, the resin is applied in a liquid state and subsequently solidified or cured. This curing process is usually accomplished by exposing the resinous adhesive to an energy source such as thermal energy, or radiation energy such as electron beam, ultraviolet (UV) light or visible light. In recent years, UV light curable resinous adhesives have become of interest due to the several advantages over thermally curable adhesives. These advantages include considerably faster cure times, lower capital investments and lower energy costs.

U.S. Pat. No. 2,322,156 (Oglesby) discloses the use of fillers in glutinous and resinous adhesives to improve the resulting binder's hardness, heat resistance and moisture resistance and to lower their overall cost. This patent refers to typical fillers as being inert, relatively nonabsorbent, nonfibrous, hard, dense, inelastic and nondeformable materials.

More recent patents disclose use of various radiation-cured resins but do not appreciate the interference that clays present to efficient radiation curing.

U.S. Pat. No. 4,318,766 (Smith) discloses photocopolymerizable compositions which may contain "conventional non-basic fillers (e.g., silica, talc, glass, glass bubbles, clays, powdered metal such as aluminum, zinc oxide, etc.) up to about 50% by volume or more." However, this patent does not mention the effect clay fillers might have on curing of radiation-curable binders.

U.S. Pat. No. 4,642,126 (Zador et al.) pertains to a lapping film containing a blend of a radiation curable resin and abrasive grains coated preferably on a film substrate.

U.S. Pat. No. 4,644,703 (Kaczmarek et al.) discloses a lapping film type abrasive product designed for fining plastic ophthalmic lenses. Radiation curable acrylates are disclosed, and the patentees state that the preferred abrasive grains are white aluminum oxide for its ability to transmit UV radiation. Fillers must be selected with UV absorbance in mind, and listed as preferred fillers are silica and calcium sulfate, although no filler is used in the examples.

U.S. Pat. No. 4,735,632 (Oxman et al.) discloses the use of a visible light photoinitiator with any free-radically polymerizable resin as a binder for coated abrasives. The patent states generally that inorganic or organic fillers may be used, and Example 5 discloses using a radiation curable binder resin filled 50% with calcium carbonate.

U.S. Pat. No. 4,751,138 (Tumey et al) pertains to electromagnetic radiation curable resin systems for coated abrasives. The binder contains either a physical mixture of materials having 1,2-epoxide groups and materials having ethylenically unsaturated groups, or materials having both groups on the same compound. Fillers which apparently may be utilized include kaolin clay; however, only quartz is used as filler in the examples of this patent, perhaps because of its transparency.

U.S. Pat. No. 4,773,920 (Chasman et al) discloses a lapping film abrasive product comprising abrasive grains and a free radical curable resin. No use of fillers is mentioned in the patent.

U.S. Pat. No. 4,903,440 (Larson et al.) discloses the use of an aminoplast resin having at least 1.1 pendant alpha, beta unsaturated groups as a binder resin for coated abrasives. Larson et al. also mention kaolin clay as a possible filler, however an aminosilane-treated calcium metasilicate filler is used in the examples of this patent.

U.S. Pat. No. 4,927,431 (Buchanan et al.) pertains to a coated abrasive binder containing a blend of thermally curable and radiation curable resins. The patent is devoid of disclosure or teaching of the use of clays as fillers.

U.S. Pat. No. 5,011,513 (Zador et al.) discloses a coated abrasive especially designed for lens fining applications. The coated abrasive comprises a substrate, a radiation cured make coating, abrasive grains and a radiation cured size coating. Zador et al. point out that fillers may, and preferably are used; however, the filler must exhibit low optical absorption, so as to not unduly interfere with the UV light curing. Thus, this reference teaches away from the use of low transmittance fillers (i.e., those providing a make coating with less than about 70% transmittance).

U.S. Pat. No. 5,014,468 (Ravipati et al.) pertains to a lapping abrasive article intended for ophthalmic applications. The lapping film comprises a patterned surface coating of abrasive grains dispersed in a radiation cured resin. Although the patent mentions that the abrasive grains must be selected to allow adequate curing by electron beam and UV radiation, and that white aluminum oxide (a low absorber of UV radiation) is thus preferred, there is no disclosure or suggestion of the use of clay fillers in the binders.

U.S. Pat. No. 5,152,917 (Pieper et al.) discloses an abrasive article having as its abrasive surface a plurality of precisely shaped abrasive composites. The abrasive composites comprise abrasive grains, a binder and optionally a filler. No suggestion of the use of clay fillers is given, nor the advantages or disadvantages of using clay fillers.

Patents which appear to be concerned with erodability of binders but do not discuss clays and their possible effect on binder erodability are the following patents.

U.S. Pat. No. 2,806,772 (Robie) discloses an abrasive body comprising a brittle, porous, pore support, abrasive grains and an organic binder. The porous support may be individual small thin-walled balloons of vitrified clay material described in U.S. Pat. No. 2,676,892 (McLaughlin). Use of addition polymerizable organic binders are not disclosed.

U.S. Pat. No. 4,588,419 (Caul et al.) discloses the use of calcium carbonate, aluminum silicate, alumina trihydrate, and fumed silica as fillers in radiation curable resins incorporated into coated abrasives to impart good rheological properties to an uncured binder and to promote flexibility and strength to the cured resins. Clay is not disclosed, nor its effect on erodability of addition polymerized binder resins.

U.S. Pat. No. 4,652,275 (Bloecher et al.) discloses erodible abrasive grain agglomerates comprising abrasive grains, a thermoset binder and a matrix material selected from wood pulp, wood flour and vermiculite. The matrix material renders the abrasive agglomerates erodible. There is no disclosure of clay or addition polymerizable binder resins.

U.S. Pat. No. 4,871,376 (DeWald) pertains to a coated abrasive binder comprising a resinous adhesive, filler, and a coupling agent providing for bonding between the resin and filler. Although there is a general listing of organic resins (e.g., acrylates) and inorganic fillers (e.g., clay) useful in binders, there is no suggestion of the advantages and disadvantages attendant with that combination of resin and filler. The examples utilize calcium metasilicate, calcium carbonate, and quartz as fillers.

Assignee's application Ser. No. 07/839,132, filed Feb. 20, 1992, now U.S. Pat. No. 5,269,821 (Helmin et al.) describes coatable mixtures including erodible filler agglomerates which are formed in situ and comprised of water-soluble and water-insoluble filler particles. During wet grinding operations, the water-soluble filler gradually dissolves. The agglomerates may be employed in many organic resins, including radiation cured resins. However, there is no teaching of the use of clay to provide a more erodible binder.

Microabrasive products have been commercialized since 1987 by assignee Minnesota Mining and Manufacturing Company, St. Paul, Minn., ("3M") under the trade designation "Imperial Beaded Microfinishing Film", which utilize as the abrasive surface grade 600 abrasive particles, clay, and a phenolic resin. While these products have enjoyed much success, the industry is continually seeking improved binder systems.

Some clays expand on exposure to water, while some do not (such as kaolin clay). See for example "Clay Colloid Chemistry", pp. 64–71 (1977). However, it appears the abrasives art is devoid of teaching the significance that clay fillers may have on the erodability of binders which include addition polymerized resins. This may be because past experience has revealed that in some instances when addition polymerized resins have been incorporated into abrasive articles, the binder does not sufficiently erode. If the binder does not sufficiently erode, the abrasive surface tends to dull and decrease in performance. It would thus be a significant advance in the abrasives art if binders incorporating addition polymerized resins would controllably erode.

SUMMARY OF THE INVENTION

In accordance with the present invention, erodible abrasive composites have been developed which exhibit a controlled rate of erosion, thus gradually and controllably exposing new abrasive particles to the workpiece being abraded. As used herein the term "composite" means the abrasive coating which is applied to a backing in coated abrasives, the abrasive coating which is applied to fibers in nonwoven abrasives, or the three dimensional body of a bonded abrasive. The term is not intended herein to be used to denote a conglomerate of individual abrasive grains; these latter are defined as "abrasive agglomerates." Composites within the invention may include agglomerates of individual abrasive grains.

The abrasive composites of the invention comprise abrasive particles dispersed in a binder, the binder comprising an addition polymerized resin having clay particles dispersed therein. "Binder" means a solidified composition including a cured, gelled or polymerized resin, where "resin" includes monomeric, oligomeric, and polymeric materials. Curing primarily involves radiation-initiated polymerization processes, but can include thermally-initiated polymerization or gelling. Preferably, all of the abrasive particles are engulfed by the clay particle-containing binder. The term "addition polymerized resin" means a resin that has been at least partially cured, gelled, or polymerized by a free radical or ionic mechanism, preferably in the presence of radiation and a photoinitiator. The terms "polymerized" and "polymerizable" are meant to include both chain growth and crosslinking reactions. "Radiation" includes "non-particle" radiation (such as UV radiation and visible radiation, which typically and preferably employ a photoinitiator), and "particle" radiation (such as electron beam irradiation, which does not require a photoinitiator).

The inventor herein has discovered that the presence of clay particles results in an abrasive composite that exhibits a "controlled rate of erosion." As used herein, this means that the composite erodes to expose new abrasive grains but does not erode at a rate which is unacceptably high for the particular use. It is also to be understood that "controlled rate" does not necessarily mean that the rate is uniform over the life of the article. While difficult to define, controlled erodability is preferred in many abrasive products, particularly in lapping coated abrasives. The addition of other inorganic particulates to the binder precursor may also contribute to erodability. However, some of these other inorganic particulates may result in "too fast" of an erosion rate; while other inorganic particulates may result in "too slow" of an erosion rate. Either too fast or too slow of an erosion rate results in an abrasive article not having an optimum cut rate. It is theorized that the addition of clay to the binder precursor results in a "controlled erosion" binder having an optimum cut rate.

Clays described herein as useful in the invention unfortunately typically absorb UV and visible radiation and thus may not allow UV or visible light to pass through sufficiently to achieve commercially acceptable curing rates. It was thus quite unexpected and surprising that the addition polymerizable resins used herein were curable even in the presence of clay.

Preferred abrasive composites in accordance with the invention are those wherein the addition polymerizable resin is selected from the group consisting of ethylenically unsaturated materials and epoxy resins. Preferred ethylenically unsaturated materials include acrylated urethane resins, acrylated epoxy resins, ethylenically unsaturated monomers (such as styrene, vinyl toluene, divinylbenzene, and the like), aminoplast resins having pendant unsaturated carbonyl groups, isocyanurate resins having at least one pendant acrylate group, isocyanate resins having at least one pendant acrylate group, and the like. It will be understood that mixtures and combinations thereof may be utilized. An especially preferred ethylenically unsaturated material for use in the present invention is the triacrylate of tris(hydroxyethyl)isocyanurate combined with trimethylol propane triacrylate. The controlled rate of erosion of the composites of the invention is observed under both wet and dry grinding conditions, wet being preferred. "Wet" as used herein refers to application of a liquid, preferably water or other aqueous mixture, to the workpiece during abrasion of the workpiece. Abrasive articles incorporating the erodible abrasive composites and methods of making and using such composites and articles are also presented.

As used herein the term "erodible" refers to the ability of a composite made in accordance with the invention to break down its structure in a controlled manner, for example, by fracture under mechanical grinding forces. A water or other aqueous flood may of course help a binder erode by carrying away broken pieces of binder.

Abrasive composites in accordance with the invention have binders wherein the clay particles have an average particle size ranging from about 0.01 micrometer to about 50 micrometers, more preferably ranging from about 0.1 to about 15 micrometers. One preferred abrasive composition within the invention is that comprising by weight (dry) from about 20 to about 95 percent abrasive particles, from about 3 to about 78 percent addition polymerized resin, and from about 2 to about 50 percent clay particles.

Coupling agents may be used with advantage in the invention to provide more adhesion between, for example, abrasive particles and addition polymerized resin, clay particles and resins, and the like. Of course, one would not use that amount of coupling agent that would counteract the erodability of the binder due to the presence of the clay particles.

Another aspect of the invention is an abrasive article comprising an abrasive composite attached to a backing, the abrasive composite comprising the inventive composite above-described. Preferred backings include primed and unprimed polymeric films, cloth, paper, vulcanized fiber, woven articles, and combinations thereof.

Articles also deemed within the invention are those having backings comprising an open, porous, fibrous, lofty, nonwoven substrate. Especially preferred nonwoven backings are those comprising thermoplastic fibers selected from the group consisting of polyamide, polyester, polypropylene, polyethylene, and combinations thereof. The distinction between coated abrasives and nonwoven abrasives is well known in the art. In the case of a nonwoven abrasive article, the abrasive composite is bonded to the fibers of an open, lofty, porous, fibrous, nonwoven web. In the case of a coated abrasive, such as a lapping abrasive article, the abrasive composite is bonded to at least one surface of a non-porous backing.

Another aspect of the invention pertains to a coated abrasive article exhibiting controlled erosion of its abrasive coating, the coated abrasive comprising:

(a) a backing having a front and a back surface; and (b) an abrasive composite attached to at least one of the front or back surfaces, the abrasive composite comprising the inventive abrasive composite previously described.

Preferred are those coated abrasives wherein the addition polymerized resin is selected from those used in the inventive abrasive composites previously described. Suitable coated abrasive articles within the invention include those wherein the abrasive composite comprises a make coating which adheres abrasive particles to the backing, and a size coating applied over the abrasive particles. Optional coatings include saturant, presize, backsize and supersize coatings, all, some, or none of which may comprise the addition polymerized resins described herein. If none of the optional coatings are comprised of addition polymerized resins, then other resins, such as thermoplastic resins, and thermoset resins, such as phenolic resins, urea-aldehyde resins, and the like, commonly used in coated abrasive manufacturing, may be utilized for those coatings.

Another aspect of the invention is a coatable dispersion comprising clay particles dispersed in a binder precursor, the binder precursor comprising an addition polymerizable resin. The term "dispersion" means a binder precursor composition which includes an uncured resin and clay particles, but not abrasive particles. The clay particles are present in an amount insufficient to prevent curing of the addition polymerizable resin by exposure to radiation energy. The phrase "an amount insufficient to prevent curing of the addition polymerizable resin by exposure to radiation energy" means that at a given radiation intensity and type of photoinitiator, if used, the amount of clay cannot exceed that amount which would render commercially unfeasible the time needed for curing of the addition polymerizable resin to create a hard, dimensionally stable binder. For this invention, when UV curing is used, in order to fully polymerize all ethylenically unsaturated monomer and other monomers present, the UV energy level should be at least about 100 to about 1200 milliJoules per $cm^{-2}$, preferably from about 400 to about 700 milliJoules per $cm^{-2}$. Cure conditions may vary with the type of radiation and initiator used, and the amount of clay present. When electron beam irradiation is used, it preferably has a dosage level ranging from about 0.1 to about 10 Mrad, more preferably 1 to 6 Mrad to effect full cure.

Preferred coatable dispersions in accordance with this aspect of the invention are those wherein the weight percentage (dry basis) of clay particles in the composition ranges from about 1 to about 50 weight percent, more preferably ranging from about 5 to about 30 weight percent.

Coatable slurries comprising the inventive dispersions and which further include abrasive particles are particularly preferred. The term "slurry" means a binder precursor composition which includes an uncured resin, abrasive particles, and clay particles. Coatable slurries within the invention having abrasive particles therein typically and preferably comprise by weight (dry basis) between about 20 to about 95 percent abrasive particles, from about 3 to about 78 percent addition polymerizable resin (including photoinitiator if used), and from about 2 to about 50 percent clay particles.

Yet another aspect of the invention is a method of making the inventive abrasive composite. The method comprises a first step of forming a slurry comprising abrasive particles, an addition polymerizable resin, optionally a photoinitiator (depending on the type and energy level of radiation energy utilized), and clay particles. The amount of clay particles is sufficient to render a controlled erosion rate for the binder but insufficient to prevent curing of the addition polymerizable resin by use of radiation energy. The second step comprises exposing the slurry to radiation energy sufficient to cure the addition polymerizable resin. Methods wherein prior to the exposing step the slurry is applied to a backing are particularly preferred.

Another aspect of the invention is a method of making a coated abrasive having make and size coatings. First, a coatable dispersion of the invention is prepared, which is then applied to a backing as a make coating. At this stage, the make coating may optionally be partially cured. Then abrasive particles are applied to the uncured or partially cured make coating, and the make coating exposed to conditions which at least partially cure the addition polymerizable resin, with a size coating then being applied. The last step is exposing the make and size coatings to conditions sufficient to fully cure the addition polymerizable resin and size coating. It will be understood that the size coating may comprise other than radiation curable resins, such as phenolic resins. Alternatively, the make coating may comprise a phenolic or other binder resin, with the size coating comprising an addition polymerizable resin, or both make and size coatings could comprise the dispersion of the invention. It should be understood that blends of addition polymerizable resins and other resins may be employed as make and/or size coatings.

A method particularly well suited for making coated abrasive articles, especially lapping abrasive articles, is another aspect of the invention. This method comprises the steps of:

1) coating a slurry onto a production tool having a three dimensional pattern, the slurry comprising an addition polymerizable resin, abrasive particles, and clay particles;

2) contacting a substrate having at least one major surface with the slurry so that the slurry wets at least one major surface of the substrate, thus forming a first intermediate article;

3) exposing the slurry to conditions sufficient to at least partially cure the addition polymerizable resin to form a second intermediate article; and 4) removing the second intermediate article from the production tool, yielding an abrasive article.

An alternative to this latter method comprises the steps of:

1) contacting a substrate having at least one major surface with a slurry such that the slurry wets at least one surface to form a first intermediate article, the slurry comprising an addition polymerizable resin, abrasive particles, and clay particles;

2) contacting the slurry of the first intermediate article to a production tool having a three dimensional pattern;

3) exposing the slurry to conditions sufficient to at least partially cure the addition polymerizable resin to form a second intermediate article; and 4) removing the second intermediate article from the production tool, yielding an abrasive article.

Preferred "conditions" referred to in the third steps of the two immediately preceding inventive methods are radiation energy, particularly UV radiation. In order to carry out these methods, it is necessary that either the substrate or the production tool be transparent to the type of radiation used. Production tools having three dimensional patterns are described generally in U.S. Pat. No. 5,152,917, incorporated by reference herein.

Methods of abrading a workpiece using the inventive abrasive composites and articles are presented as another aspect of the invention. One method of abrading a workpiece within the invention comprises creating relative movement between a workpiece and the abrasive composite of the invention while the abrasive composite contacts the workpiece with sufficient force to abrade the workpiece.

An alternative method of abrading a workpiece comprises using an abrasive article comprised of a backing and an abrasive composite attached thereto. The method is essentially identical to the previously described method of abrading a workpiece, except that in this method the abrasive composite comprises a make coating, abrasive particles attached to the backing by the make coating, and a size coating over the abrasive particles and make coating. Either the make coating, size coating, or both comprise a radiation cured resin having a plurality of clay particles dispersed therein.

Further aspects and advantages will be understood with reference to the description of preferred embodiments which follows.

DESCRIPTION OF PREFERRED EMBODIMENTS

During the manufacture of the abrasive articles of the invention, the binder precursors are exposed to energy sufficient to cure the addition polymerizable resins and other resins which may be present. If non-particle (e.g., ultraviolet, visible) radiation is used, a photoinitiator is preferred to generate free radicals. Alternatively, an ionic (preferably cationic) source could be used. This free radical source or ionic source then initiates the polymerization of the addition polymerizable resin. Electron beam curing typically does not require a photoinitiator, but photoinitiators may be used to accelerate cure. In all addition polymerization conditions, heat may expedite the curing process.

Clay Particles

It is theorized that various clays induce cured addition polymerized resins to be more erodible than the resin would otherwise be absent the clay. This phenomenon causes binders incorporating addition polymerized resins and clay to controllably erode, allowing worn or dulled abrasive particles to be broken away from the abrasive composite and new abrasive particles to be exposed. Newly exposed abrasive particles are typically more efficient in cutting than dull abrasive particles. The addition of clay results in a "controlled erosion" rate which results in an optimum cut rate. If the erosion rate is too slow, then the dulled abrasive particles are not broken away fast enough; this leads to reduced performance. If the erosion rate is too fast, then the abrasive particles are broken away before their full utilization; this also results in a less optimum use of the abrasive article.

Clays may be generally described as hydrated silicates of aluminum, magnesium, or iron. They usually exhibit a sheet-like, platy structure, typically consist of very fine particles, and usually contain impurities such as quartz, carbonates, or sulfides which are nonclay-like.

clays useful in the invention may be broadly classified as crystalline or amorphous. Amorphous clays belong to the allophane group, while crystalline clays belong to the phyllosilicate group. The phyllosilicate group is further divided into planar hydrous and nonplanar hydrous minerals. Examples of planar hydrous clay minerals are kaolinite, talc, pyrophyllite, saponite, montmorillonite, muscovite, clintonite, and clinochlore. Examples of nonplanar hydrous clay minerals are antigorite, greenalite, ganophylite, bannisterite, and chrysotile. A recent classification of crystalline clay minerals by the Clay Minerals Society Nomenclature Committee may be found in Clays and Clay Minerals, Vol. 39, No. 3, pp. 333–335 (1991). Note that while many of these clay minerals are the primary ingredients of clays they may also be present in large "rock" particles and would not then typically be considered clays.

Crystalline clays may be transformed into amorphous clays by heating and driving off water of hydration (i.e., chemically bound water), and it may be that an original amount of crystalline clay may transform to amorphous clay during grinding operations.

Three particularly preferred clays for use in the invention are kaolin, calcined (amorphous) kaolin, and montmorillonite (bentonite).

Although clay particles are platy, a particle size range can be useful to describe them. For the purposes of this invention clay particles preferably range in average particle size between about 0.01 micrometer to about 50 micrometers, more preferably between about 0.1 micrometer to about 15 micrometers, and particularly preferably between about 0.1 micrometer to about 5 micrometers. The average particle size of the clay particles may be less than, greater than, or equal to the average particle size of the abrasive particles. In some instances it may be preferred that the average particle size of the clay particles be less than the average particle size of the abrasive particles so that the clay particle-containing binder precursor can engulf the abrasive particles without substantial void space between the clay particle-containing binder and abrasive particles.

Coatable Compositions and Abrasive Composites

Coatable binder precursor compositions within the invention include dispersions and slurries, as previously defined. The dispersions and slurries contain an amount of clay sufficient to render the cured binder more erodible but insufficient to prevent curing of the addition polymerizable resin by exposure to radiation (and a photoinitiator if needed). In other words, using a given radiation energy (and photoinitiator, if required), the amount of clay preferably does not exceed that amount which would render the time required for curing of the addition polymerizable resin to create a hard, dimensionally stable binder commercially unfeasible. Generally, as the weight ratio of clay to resin increases, the "depth of cure" decreases, where depth of cure is measured from the exposed surface of the binder precursor in a direction opposite the point of origin of the radiation source.

Coatable dispersions within the invention preferably comprise on a dry weight basis from about 1 to about 50 weight percent clay particles, more preferably from about 5 to about 30 weight percent clay particles, with the balance comprising addition polymerizable resin. Coatable slurries having clay particles, addition polymerizable resin, and abrasive particles will comprise by weight between about 20 to 5 percent, preferably between about 40 to 80 percent abrasive particles; about 3 to 78 percent, preferably between about 10 to 50 percent addition polymerizable resin; and about 2 to 50, preferably between about 5 to 30 percent clay particles. These ratios will vary depending upon the desired properties for the abrasive article binder. A more erodible binder generally requires more clay and less binder.

Abrasive composites within the invention, as stated previously, comprise abrasive particles dispersed in a binder, the binder comprising an addition polymerizable resin having clay particles dispersed therein. Preferably, all of the abrasive particles are engulfed (i.e., totally surrounded) by the clay particle-containing binder. However, in the case when make and size coatings are utilized in coated abrasives, the abrasive particles are adhered to the backing by the make resin and supported further by the size resin. Either the make coating, size coating, or both may comprise addition polymerizable resin having clay particles dispersed therein.

The relative amounts of addition polymerizable resin, clay particles, and abrasive particles in the abrasive composites of the invention is, of course, directly related to the relative amounts of these ingredients in the coatable compositions described previously.

Addition Polymerizable Resins

Addition polymerizable resins useful in the practice of the invention are those resins capable of being cured by the exposure to radiation energy, either in the presence of a photoinitiator or without an initiator. Useful resins include those curable by particle radiation, non-particle radiation, or both. Non-particle radiation includes UV radiation and visible light, while the most commonly used particle radiation used is electron beam irradiation. A combination of particle and non-particle radiation energy sources may be used, but non-particle radiation energy sources, particularly UV and visible light energy sources, are presently preferred.

Electron beam irradiation preferably has a dosage level ranging from about 0.1 to about 10 Mrad, more preferably 1 to 6 Mrad. UV radiation is non-particle radiation having wavelength ranging from about 200 to about 700 nanometers, preferably from about 250 to about 400 nanometers. Visible radiation is non-particle radiation having a wavelength ranging from about 400 to about 800 nanometers, preferably ranging from about 400 to about 550 nanometers.

When a photoinitiator is exposed to non-particle radiation such as ultraviolet radiation or visible light, the photoinitiator generates a free radical or an ion. This free radical or ion initiates the polymerization of addition polymerizable resins.

Examples of addition polymerizable resins preferred for use in the present invention and that are capable of being polymerized by non-particle radiation include acrylated monomers, oligomers, and polymers (such as acrylated urethane resins and acrylated epoxy resins); ethylenically unsaturated monomers (such as styrene, divinylbenzene, vinyl toluene, and the like); aminoplast resins having pendant unsaturated carbonyl groups, and the like, such as those having at least 1.1 pendant alpha, beta-unsaturated carbonyl groups per molecule or oligomer, which are further described in U.S. Pat. No. 4,903,440, incorporated herein by reference; isocyanurate resins having at least one pendant acrylate group, and the like, which are described in U.S. Pat. No. 4,652,275, incorporated herein by reference (such as the triacrylate of tris(hydroxyethyl) isocyanurate); isocyanate resins having at least one pendant acrylate group; epoxy resins; and mixtures and combinations thereof. The term "acrylated" is meant to include monoacrylated, diacrylated, and multiacylated monomers, oligomers, and polymers, and monomethacrylated, dimethacrylated, and multimethacrylated monomers, oligomers, and polymers. "Oligomer" has its generally accepted meaning as a material comprised of 2 to 5 identical monomer units. Another generally accepted definition is that an oligomer is a polymer whose properties change with the addition or removal of one or a few repeating units. The properties of a true polymer do not change markedly with such modification.

It is noteworthy to mention that monomers which are solids at room temperature may be used if dissolved in a suitable diluent. This is the case with the triacrylate of tris(hydroxyethyl)isocyanurate ("TATHEIC"), one particularly preferred resin, which is a solid at room temperature. When this monomer is used, the "polymerizable resin" for which viscosity reduction is attained includes the diluent, which may or may not be reactive with the monomer, but preferably is reactive with the monomer (and is therefore considered another monomer). One preferred diluent for room temperature solid acrylated monomers is trimethylol propane triacrylate ("TMPTA"); however, diluents such as these are more correctly referred to as reactive diluents when the polymerizable resin is already liquid at room temperature (i.e., about 25° C.). When TATHEIC is used, the combination of TATHEIC/TMPTA is considered as the polymerizable resin in the slurries and dispersions of the invention. The weight ratio of TATHEIC/TMPTA preferably ranges from about 1:2 to about 2:1, more preferably from about 1:1.7 to about 1.7:1, most preferably 1:1. It should be noted that TATHEIC or TMPTA may be used alone as the addition polymerizable resin, with only a slight decrease in grinding performance being noticeable.

Acrylated urethane oligomer resins are preferably acrylate esters of hydroxy-terminated, isocyanate-extended polyester or polyether polyols transesterified with low molecular weight acrylates (such as 2-hydroxyethyl acrylate). The number average molecular weight of preferred acrylated urethane oligomer resins ranges from about 300 to about 10,000, more preferably from about 400 to about 7,000. Examples of commercially available acrylated urethane oligomer resins are those marketed under the trade designations "UVITHANE 782" (available from Morton Thiokol Chemical) and "CMD 6600", "CMD 8400", and "CMD 8805" (available from Radcure Specialties).

Epoxy resins have an oxirane ring and are polymerized by ring opening. Such epoxide resins include monomeric and oligomeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of acceptable substituent groups include halogens, ester groups, ether groups, sulfonate groups, siloxane groups, nitro groups and phosphate groups. Examples of some preferred epoxy resins include 2,2-bis[4-(2,3-epoxypropoxy)phenyl)propane] (a diglycidyl ether of bisphenol A) and commercially available under the trade designations "Epon 828", "Epon 1004" and "Epon 1001F" available from Shell Chemical Co , and "DER-331", "DER-332" and "DER-334" available from Dow Chemical Co. Other suitable epoxy resins include glycidyl ethers of phenol formaldehyde novolak resins (e.g. those known under the trade designations "DEN-431" and "DEN-438" available from Dow Chemical Co.). Epoxy resins useful in the invention can polymerize via a cationic mechanism with the addition of an appropriate photoinitiator(s). These resins are further described in U.S. Pat. No. 4,318,766, incorporated herein by reference.

Acrylated epoxy oligomer resins are acrylate esters of epoxy resins, such as the diacrylate esters of bisphenol-A epoxy resin. Examples of commercially available acrylated epoxy oligomer resins include those known under the trade designations "CMD 3500", "CMD 3600", and "CMD 3700", available from Radcure Specialties.

Other addition polymerizable resins useful in the invention include those that contain atoms of carbon and hydrogen, and optionally oxygen, nitrogen and the halogens. Oxygen or nitrogen atoms or both are generally present in ether, ester, urethane, amide, and urea linkages.

Diluents may also be used in the slurries and dispersions of the invention. As used herein the term "diluent" connotes a low molecular weight (preferably less than about 500) organic compound that may or may not decrease viscosity of compositions to which they are added. "Reactive" diluents are diluents which react with the resin and remain in the cured binder in a chemically bound state, while "inert" diluents are diluents that do not react with the resin. Both reactive and inert diluents may be utilized in the invention.

Preferred reactive diluents are acrylates having a molecular weight ranging from about 100 to about 500, including ethylene glycol diacrylate, ethylene glycol dimethacrylate, hydroxypropyl methacrylate, tetrahydrofurfuryl acrylate, hydroxyethyl methacrylate, hexanediol diacrylate, triethylene glycol diacrylate, trimethylol propane triacrylate, glycerol triacrylate, pentaerthyitol triacrylate, pentaerythritol trimethacrylate, pentaerythritol tetraacrylate, pentaerythritol tetramethacrylate, and the like.

Other useful reactive diluents include methacrylates such as methyl methacrylate and ethyl methacrylate; monoallyl, polyallyl, and polymethallyl esters and amides of carboxylic acids (such as diallyl phthalate, diallyl adipate, and N,N-diallyladipamide); tris(2-acryloyl-oxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

Addition polymerizable resins which are non-particle radiation curable preferably include a photoinitiator. Examples of photoinitiators that when exposed to ultraviolet light generate a free radical include organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that when exposed to visible radiation generate a free radical are described in U.S. Pat. No. 4,735,632, incorporated herein by reference.

Cationic photoinitiators generate an acid source which initiates the polymerization of some addition polymerizable resins, such as epoxy resins. Cationic photoinitiators can include a salt having an onium cation and a halogen containing complex anion of a metal or metalloid. Other useful cationic photoinitiators include salts of organometallic complex cations and halogen-containing complex anions of a metal or metalloid, which are further described in U.S. Pat. No. 4,751,138, incorporated herein by reference. Still other useful cationic photoinitiators are organometallic salts and onium salts, described in U.S. Pat. No. 4,985,340, and European Patent Applications 306,161 and 306,162, both published Mar. 8, 1989, all incorporated herein by reference. Yet other useful cationic photoinitiators include ionic salts of an organometallic complex in which the metal is selected from the elements of Periodic Group IVB, VB, VIB, VIIB and VIIIB, such salts being described in European Patent Application 109,581 (published May 30, 1984), incorporated herein by reference.

Photoinitiators, when used, preferably comprise from about 0.1 to about 10 weight percent of the dispersion or slurry, more preferably form about 1 to about 5 weight percent.

Abrasive Articles

Abrasive articles are defined herein as a backing having the abrasive composite of the invention adhered thereto, although the term "abrasive articles" is intended to include the abrasive composite itself (i.e., without a backing).

Nonwoven abrasive articles are well known in the art and generally illustrated in U.S. Pat. No. 2,958,593, incorporated herein by reference. In general they comprise open, lofty, webs of fibers bonded together at points where they contact by a binder.

In the case of coated abrasives, such as lapping abrasive articles, the abrasive composite of the invention is bonded to at least one surface of a backing. In the case of a lapping coated abrasive, the backing is preferably a continuous (i.e., non-porous) polymeric film, preferably primed with an ethylene acrylic acid copolymer. Examples of typical and preferable backing materials utilized in lapping abrasive articles are polymeric films having melting temperatures able to withstand the frictional heat generated during abrasion (e.g., polyester, and the like), primed polymeric film, cloth, paper and other nonwovens, and treated versions thereof and combinations thereof. Vulcanized fiber backings may also be useful in coated abrasives.

Coated abrasives in accordance with the invention made using make and size coatings have at least one of the make and size coatings formed from a dispersion comprising an addition polymerizable resin, an optional photoinitiator, and a plurality of clay particles dispersed therein. The addition polymerizable resin, photoinitiator, and clay particles for these embodiments are the same as previously described. Additionally, the dispersions of the invention may contain other optional additives. These additives include fillers (including grinding aids), fibers, lubricants, wetting agents, surfactants, pigments, dyes, coupling agents, plasticizers and suspending agents. In some cases there may be a beneficial synergistic effect on abrading performance when clay particles are employed with other optional fillers, such as calcium carbonate. The amounts of these optional materials are selected to provide the properties desired. The dispersions may also include either organic solvent and/or water as needed.

As previously stated, the make coating and/or size coating may comprise the dispersion of the invention. Optionally, the dispersion can be used as a supersize coating, i.e., the adhesive coating over the size coating, or as a backing substrate treatment or coating. In particular, the backing may have a saturant coating which saturates the substrate, a backsize coat which is present on the back side of the backing opposite the abrasive particles, or as a presize coating which is present on the front side of the backing, between the backing and the make coating. However, as the primary intent is to have the composite of the invention controllably erode during the abrading process, the advantages of using the dispersions of the invention in these optional coatings are lessened or not exhibited. Thus, the dispersion of the invention comprising an addition polymerized resin and clay particles is preferably the precursor to at least one of the make or size coatings to effect the advantage of presenting new abrasive particles to the workpiece. The other binder coatings can be any of the traditional adhesive resins used in abrasive articles, such as phenolic resins, aminoplast resins, urethane resins, lattices, epoxy resins, urea-aldehyde resins, isocyanurate resins, and mixtures thereof.

Depending upon the particular traditional resin, the binder precursor containing the traditional resin may further include a catalyst or curing agent. The catalyst and/or curing agent will either help to initiate and/or accelerate the polymerization process.

Additionally, the traditional binder coatings may also include other additives well known in the coated abrasive art. These additives include fillers (including grinding aids), fibers, lubricants, wetting agents, surfactants, pigments, dyes, coupling agents, plasticizers and suspending agents. The amounts of these materials are selected to provide the properties desired.

Backing Materials for Coated Abrasives

The backing can be any number of various materials conventionally used as backings in the manufacture of coated abrasives, such as paper, cloth, film, vulcanized fiber, woven and nonwoven materials, and the like, or a combination of two or more of these materials or treated versions thereof. The choice of backing material will depend on the intended application of the abrasive article. The strength of the backing should be sufficient to resist tearing or other damage in use, and the thickness and smoothness of the backing should allow achievement of the product thickness and smoothness desired for the intended application. The adhesion of the inventive slurry or dispersion to the backing should also be sufficient to prevent significant shedding of individual abrasive particles or the abrasive coating during normal use. In some applications it is also preferable that the backing be waterproof. The thickness of the backing should be sufficient to provide the strength desired for the intended application; nevertheless, it should not be so thick as to affect the desired flexibility in the coated abrasive product. It is preferred that the backing be a polymeric film, such as polyester film, for lapping coated abrasives, and that the film be primed with a material, such as ethylene acrylic acid copolymer, to promote adhesion of the inventive slurry or dispersion and resulting abrasive composite to the film. It is also preferred that the backing be transparent to ultraviolet or visible radiation if a method involving a non-transparent production tool having a three dimensional pattern thereon is used, as discussed herein below.

In the case of a woven backing, it is sometimes preferable to fill the interstices of the backing with at least one coating before the application of the inventive slurry or dispersion. Coatings used for this purpose are called saturant, back or presize coatings, depending on how and to what surface of the backing the coating is applied.

The backing may comprise a laminate of backings made by laminating two or more plies of either similar or dissimilar backing materials. For example, the backing can be laminated to a stiffer, more rigid substrate, such as a metal plate, to produce a coated abrasive article having an abrasive coating supported on a rigid substrate.

The surface of the backing not containing the abrasive coating may also contain a pressure-sensitive adhesive or a hook and loop type attachment system so that the abrasive article can be secured to a back-up pad. Examples of pressure-sensitive adhesives suitable for this purpose include rubber-based adhesives, acrylate-based adhesives, and silicone-based adhesives.

Abrasive Particles

Individual abrasive particles may be selected from those commonly used in the abrasive art, however, the abrasive particles (size and composition) will be chosen with the application of the abrasive article in mind. In choosing an appropriate abrasive particle, characteristics such as hardness, compatibility with the intended workpiece, particle size, reactivity with the workpiece, as well as heat conductivity may be considered.

The composition of abrasive particles useful in the invention can be divided into two classes: natural abrasives and manufactured abrasives. Examples of natural abrasives include: diamond, corundum, emery, garnet, buhrstone, chert, quartz, sandstone, chalcedony, flint, quartzite, silica, feldspar, pumice and talc. Examples of manufactured abrasives include: boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

Abrasive particles useful in the invention typically and preferably have a particle size ranging from about 0.1 micrometer to about 1500 micrometers, more preferably ranging from about 0.1 micrometer to about 1300 micrometers. The abrasive particles preferably have an average particle size ranging from about 0.1 micrometer to about 700 micrometers, more preferably ranging from about i to about 150 micrometers, particularly preferably from about 1 to about 80 micrometers. It is preferred that abrasive particles used in the invention have a Moh's hardness of at least 8, more preferably above 9; however, for specific applications, softer particles may be used.

The term "abrasive particle" includes agglomerates of individual abrasive particles. An abrasive agglomerate is formed when a plurality of abrasive particles are bonded together with a binder to form a larger abrasive particle which may have a specific particulate structure. The plurality of particles which form the abrasive agglomerate may comprise more than one type of abrasive particle, and the binder used may be the same as or different from the binders used to bind the agglomerate to a backing.

Although not required, when curing by use of radiation, curing appears to be faster if the refractive index of the abrasive particles matches or is close to the refractive index of the particular resin being used. The preferred abrasive particle is white aluminum oxide due to its relatively non-ultraviolet radiation absorbance property.

Coupling Agents

The inventive slurries, dispersions, and articles may also contain coupling agents if further viscosity reduction is required, such as disclosed by DeWald, U.S. Pat. No. 4,871,376, incorporated by reference herein for its relevant teaching. Preferred coupling agents operate through two different reactive functionalities: an organofunctional moiety and an inorganic functional moiety. When a coated abrasive binder precursor system (i.e. resin/filler mixture) is modified with a coupling agent, the organofunctional group of the coupling agent becomes bonded to or otherwise attracted to or associated with the uncured resin. The inorganic functional moiety appears to generate a similar association with the dispersed inorganic filler. Thus, the coupling agent acts as a bridge between the organic resin and the inorganic filler at the resin/filler interface. In various systems this results in:

1. Reduced viscosity of the resin/filler dispersion. Such a dispersion, during a process of preparing a coated abrasive product, is typically applied as a coating, for example as a make coating or size coating, to the product. Reduced viscosity generally facilitates application.

2. Enhanced suspendability of the filler in the resin, i.e., decreasing the likelihood that suspended or dispersed filler will settle out from the resin/filler suspension during storing or processing to manufacture abrasive articles.

3. Improved product performance due to enhanced operation lifetime, for example through increased water resistance or general overall observed increase in strength and integrity of the bonding system.

Herein, the term "coupling agent" includes mixtures of coupling agents.

An example of a coupling agent found suitable for this invention is gamma-methacryloxypropyltrimethoxy silane known under the trade designation "A-174" from Union Carbide Corporation. Other suitable coupling agents are zircoaluminates, and titanates. Further examples which illustrate the use of silane, titanate, and zircoaluminate coupling agents are disclosed in U.S. Pat. No. 4,871,376, which was previously partially incorporated herein by reference.

Methods of Making Abrasive Composites and Articles

The abrasive composite of the invention is formed from a slurry that comprises a plurality of abrasive particles, an addition polymerizable resin, a photoinitiator (if the resin is non-particle radiation curable), and a plurality of clay particles. Methods of making the abrasive composite may be described as comprising the steps of:

a. preparing a slurry by combining:
  1. a plurality of abrasive particles;
  2. an addition polymerizable resin;
  3. a photoinitiator, if needed;
  4. a plurality of clay particles; and
  5. optional ingredients such as grinding aids; and b. exposing the slurry to radiation energy sufficient to cure the resin.

In step (a), it is preferred that the radiation curable resin and photoinitiator, if required, are first mixed together, then the abrasive and clay particles. It is preferred that the abrasive particles and clay particles are uniformly dispersed throughout the resins. In some instances a high shear mixer is employed to achieve a uniform suspension. Methods wherein the slurry is first applied to a substrate backing are alternate methods within the invention.

For a nonwoven abrasive article, the slurry is then applied to a three-dimensional nonwoven substrate. Typically, this is accomplished by spray coating or roll coating. For a lapping coated abrasive article, the slurry is applied to the front side of a backing by any conventional means such as spray coating, roll coating, die coating or knife coating.

Next, the slurry is exposed to a radiation source, preferably UV or visible light, to cure the resin. The amount of energy required (given the same backing and tooling) is primarily dependent upon the resinous adhesive chemistry and secondarily on the thickness of the binder precursor. Typically the amount of time the binder precursor is exposed to the radiation source can range from about 0.1 to 100 seconds, but is preferably less than 5 seconds.

One particularly preferred method of making a lapping abrasive is described in the assignee's U.S. Pat. No. 5,152,917 (Pieper et al.), previously incorporated herein by reference. One method involves 1) introducing a slurry onto a production tool, wherein the production tool has a three dimensional pattern, 2) introducing a substrate to the outer surface of the production tool such that the slurry wets one major surface of the substrate to form an intermediate article; 3) exposing the slurry to conditions sufficient to at least partially cure or gel the resin before the intermediate article departs from the outer surface of the production tool to form a second intermediate article; and 4) removing the second intermediate article from the production tool. Another method involves 1) introducing a slurry onto a substrate such that the slurry wets the front side of the substrate to form an intermediate article; 2) introducing the intermediate article to a production tool having a three dimensional pattern; 3) exposing the slurry to conditions sufficient to at least partially cure or gel the addition polymerizable resin before the intermediate article departs from the outer surface of the production tool to form a second intermediate article; and 4) removing the second intermediate article from the production tool. In these two methods, the resulting solidified slurry or abrasive composite will have the inverse pattern of the production tool. By at least partially curing or solidifying the slurry on the production tool, the abrasive composite has a precise and predetermined pattern. The addition polymerizable resin can be further solidified or cured after the partially cured article is taken off of the production tool. The pattern of the production tool may be treated with a release agent, such as a silicone, to ease removal of the article.

It is preferred that the slurry be heated prior to entering the production tool, typically at a temperature ranging from about 40° C. to 90° C. When the slurry is heated it flows more readily into the cavities of the production tool three dimensional surface, thereby minimizing imperfections. The viscosity of the slurry is preferably closely controlled for several reasons. For example, if the slurry viscosity is too high, it will be difficult to apply the slurry to the production tool.

The production tool can be a belt, a sheet, a coating roll, a sleeve mounted on a coating roll, or a die. It is preferred that the production tool be a coating roll. Typically, a coating roll has a diameter between about 25 cm and 45 cm and is constructed of a rigid material, such as metal. The production tool, once mounted on a coating machine, may be powered by a power-driven motor.

As previously noted, the production tool has a predetermined three dimensional pattern or array of at least one specified shape on the surface thereof, which is the inverse of the pattern of the abrasive composite of the article of the invention. Although not a critical aspect of the present invention, the three dimensional pattern of the production tool preferably comprises an array of asymmetric pyramids, as detailed in FIGS. 6, 7, and 18 of the previously mentioned Pieper et al. patent.

Production tools for the process can be prepared from metal, e.g., nickel, although plastic tools can also be used. A production tool made of metal can be fabricated by engraving, hobbing, assembly as a bundle a plurality of metal parts machined in the desired configuration, or other mechanical means, or by electroforming. The preferred method is by diamond turning. These techniques are further described in the *Encyclopedia of Polymer Science and Technology*, Vol. 8, John Wiley & Sons, Inc. (1968), pp. 651–665, and U.S. Pat. No. 3,689,346, column 7, lines 30 to 55, all incorporated herein by reference.

In some instances, a plastic production tool can be replicated from an original metal tool. The advantages of plastic tools as compared with metal tools are cost and the ability to use non-transparent backings for abrasive articles. The use of a non-transparent backing requires that the radiation is transmitted through the transparent tooling. A thermoplastic resin, such as polypropylene, can be embossed onto the metal tool at its melting temperature and then quenched to give a thermoplastic inverse replica of the metal tool. This plastic replica can then be utilized as the production tool.

For addition polymerizable resins initiated by radiation energy, it is preferred that the production tool be heated, typically in the range of 30° C. to 140° C., to provide for easier processing and release of the abrasive article. Of course, heating should be limited in the case of plastic transparent tooling to avoid distortion of the pattern and decrease the longevity of the plastic tooling.

Methods of making coated abrasive articles having make and size coatings, one of which comprises addition polymerizable resin and clay, were described previously. Illustrated below is an example of how to make a coated abrasive article having various optional coatings.

As a first optional coating, a substrate may be saturated with a saturant coating precursor by any conventional technique such as dip coating or roll coating.

After the saturant coat is applied, optional backsize and/or presize coating precursors are applied by a technique such as roll coating, die coating, or knife coating. The make coating precursor is applied over the optional presize. Optionally, the make coating is then partially cured. The abrasive particles are then projected into the make coating precursor. Preferably, the abrasive particles are projected by an electrostatic coating process, although drop coating may suffice. The make coating is then exposed to conditions sufficient to at least partially cure the make coating. Then a size coating precursor is applied over the abrasive grains by any conventional technique. Finally, if desired, a supersize coating precursor is applied over the size coating by any one of the previously mentioned techniques.

For those coatings which include addition polymerizable resin, those coatings are exposed to radiation energy to initiate polymerization of the resin. If the other coatings contain thermosetting binder precursors, they may be solidified by application of heat. In addition, it is believed that heating will accelerate radiation polymerization, so that combinations of various energy sources may be used with good results. The choice of the energy source utilized will depend upon the chemistry of the resins employed, the thickness of the coating, the thickness of the backing if radiation must pass through it, the type and amount of abrasive and clay particles, and the like.

All coating precursors are at least either partially dried or partially cured such that each coating is dry to the touch before the next coating is applied. Alternatively the coatings can be fully cured before the next coating is applied. After the last coating is applied, the remaining partially cured coatings are subject to conditions which substantially fully cure the coatings.

The following test procedures were used throughout the examples.

Disc Test Procedure I

Coated abrasive articles for each example were converted into 10.2 cm diameter discs and secured to a foam back-up pad by means of a pressure sensitive adhesive. The coated abrasive disc and back-up pad assembly was installed on a Schiefer testing machine, and the coated abrasive disc was used to abrade a polymethyl methacrylate polymer workpiece using a force of 4.5 kg. All of the testing was done using a water flood. The amount of workpiece abraded or cut was measured for every 500 cycles. The cut values were listed as a percent of the Comparative Example, i.e., the amount that the example cut divided by the amount that the comparative example cut multiplied by 100%. Additionally in some instances, the surface finish (Ra and RZ) generated by the abrasive article on the workpiece was measured. Ra is the arithmetic average of the scratch size in microinches. Rz was the mean of the five consecutive individual roughness measurements. The surface finish was measured using a profilometer known under the trade designation "Perthen", built by Perthometer MYB. The ideal coated abrasive has a high cut rate and a low surface finish value.

Disc Test Procedure II

Disc Test Procedure II was the same as Disc Test Procedure I, except that the workpiece was cellulose acetate butyrate polymer and the testing was done dry.

Test Procedure III

Each coated abrasive article to be tested was converted into a 5.7 cm by 22.9 cm rectangular sheet. The abrasive article was secured using clips to a 4.54 kg metal block back up pad. The coated abrasive surface contacting the workpiece was 5.7 cm by 15.1 cm. The workpiece was a 45 cm by 77 cm metal plate which was coated with a urethane primer of a type commonly used in the automotive paint industry. During sanding, the surface of the workpiece was flooded with water. The abrasive article/back up pad was moved 90 strokes against the workpiece to sand the urethane primer. A stroke was the movement of the operator's hand in a straight line back and forth motion. The cut, i.e. the amount in micrometers of primer removed, was measured after 90 strokes. The paint thickness was measured with a measurement tool known under the trade designation "Elcometer", sold by Elcometer Instruments Limited, Manchester, England. The surface finish Ra, i.e., the surface finish of the primer abraded, was measured after 10 cycles. The surface finish was measured using the same profilometer as in Disc Test Procedure I.

The following non-limiting examples will further illustrate the invention. All parts, percentages, ratios, etc., in the examples are by weight unless otherwise indicated.

EXAMPLES

The following materials were used in the Examples.
TATHEIC denotes a triacrylate of tris(hydroxyethyl) isocyanurate
PH1 denotes 2,2-dimethoxy-1-2-diphenyl-1-ethanone, commercially available from Ciba Geigy Company under the trade designation "Irgacure 651"
TMPTA denotes trimethylol propane triacrylate
WAO denotes white fused aluminum oxide abrasive particles
ASP denotes clay particles having an average particle size of about 2 micrometers, commercially available from the Engelhard Company of Edison, N.J. under the trade designation "ASP 600"
PC denotes clay particles having an average particle size of about 3 micrometers, commercially available from R. T. Vanderbilt of Norwalk, Conn., under the trade designation "Peerless #4"
CA denotes gamma-methacryloxypropyltrimethoxy silane, a coupling agent commercially available from the Union Carbide Corporation under the trade designation "A-174"
CS denotes a natural cryolite available from Washington Mills Abrasives having average particle size of about 3 micrometers
CC denotes calcium carbonate filler having an average particle size of about 15 micrometers
CMS denotes a calcium metasilicate filler treated with an amino silane coupling agent commercially available from the Nyco Company Examples 1 and 2 and Comparative Examples A and B This set of examples compared various abrasive article constructions. The abrasive articles were tested according to Disc Test Procedure I and the test results can be found in Tables 2 and 3.

The abrasive articles of Examples 1 and 2 and Comparative Example A were made according to the teaching of U.S. Pat. No. 5,152,917. First, a slurry was prepared by thoroughly mixing the following materials listed in Table 1. The addition polymerizable resin was a mixture of TATHEIC/TMPTA/PH1 at a ratio of 50/50/2. The white aluminum oxide abrasive particles had an average particle size of 40 micrometers. The slurry was coated onto a nickel production tool having an array of pyramids such that the abrasive slurry filled the recesses between pyramids. The pyramidal pattern was substantially identical to that illustrated in FIGS. 6, 7 and 18 of the previously incorporated Pieper et al. patent. The pattern was asymmetric, with one base width being about 360 micrometers, while another base width was about 400 micrometers. The pyramid height was about 180 micrometers.

Next, a 102 micrometer thick polyester film substrate was pressed against the acrylic production tool by means of a plastic squeegie and the abrasive slurry wetted the front surface of the polyester film. The front surface of the polyester film contained an ethylene acrylic acid copolymer primer.

UV light was then transmitted through the polyester film and into the slurry, thus initiating the polymerization of the resin. This was carried out using a UV curing unit available from Radiation Polymer Company, which consisted of a UV processor model number QC-1202A/NSPL, and two 30.5 cm UV metal end mercury lamps, Type H, made by Aetek International. As measured using a UV curing radiometer which integrated at 365 nanometers, the dosage used was between 170–260 milliJoules/cm$^2$ for each pass. Four passes were used. This dosage of UV light resulted in the slurry being transformed into an abrasive composite adhered to the polyester film substrate.

Next, the polyester film/abrasive composite construction was separated from the production tool to yield an abrasive article.

The abrasive article for Comparative Example B was a grade 320 (34 micrometer average mineral particle diameter) abrasive grain-containing A weight paper coated abrasive known under the trade designation "Three-Mite Wetordry" commercially available from the 3M Company, St. Paul, Minn.

TABLE 1

Abrasive Slurry Formulations

| Example | Resin | WAO | ASP | CA |
| --- | --- | --- | --- | --- |
| 1 | 20 | 70 | 10 | 1 |
| 2 | 25 | 70 | 5 | 1 |
| A | 30 | 70 | 0 | 1 |

TABLE 2

Disc Test Procedure I
Cut Values as a Percent of Comparative Example B

| Example | 500 cycles | 1000 cycles | 1500 cycles | 2000 cycles |
| --- | --- | --- | --- | --- |
| 1 | 102.1 | 105.3 | 109.0 | 115.0 |
| 2 | 101.6 | 105.5 | 109.2 | 115.1 |
| A | 63.1 | 66.4 | 69.6 | 74.8 |
| B | 100.0 | 100.0 | 100.0 | 100.0 |

TABLE 3

Disc Test Procedure I
Surface Finish Data

| Example | 500 cycles | | 2000 cycles | |
| --- | --- | --- | --- | --- |
| | Ra | Rz | Ra | Rz |
| 1 | 24.3 | 178 | 21.3 | 159 |
| 2 | 24.0 | 174 | 21.0 | 144 |
| A | 17.3 | 122 | 16.7 | 134 |
| B | 25.0 | 166 | 21.0 | 157 |

It can be concluded that the addition of the clay particles increased the initial cut from 63 to 102% of the comparative example. A controlled abrasive composite breakdown was seen even under this relatively low pressure test. Comparative Example A did not appear to break down at all.

Examples 3–5 and Comparative Examples B–G

The abrasive articles for Examples 3 through 5 and Comparative Examples C through G were made in the same manner as explained in Example 1 except that different slurries were employed. The compositions of these slurries can be found in Table 4. The resin and the abrasive particles were the same as Example 1. The filler column refers to the amount and type of an inorganic particulate added to the slurry in each instance. The abrasive articles made in this set of examples were tested according to Test Procedures I–III and the test results can be found in Tables 5 through 8.

TABLE 4

Abrasive Slurry Formulations

| Example | Resin | WAO | Filler | CA |
|---------|-------|-----|--------|-----|
| 3 | 25 | 70 | 5 ASP | 1 |
| 4 | 25 | 70 | 5 PC | 1 |
| 5 | 20 | 70 | 10 PC | 1 |
| C | 25 | 70 | 5 CS | 1 |
| D | 20 | 70 | 10 CS | 1 |
| E | 25 | 70 | 5 CC | 1 |
| F | 20 | 70 | 10 CC | 1 |
| G | 25 | 70 | 5 CMS | 1 |

TABLE 5

Disc Test Procedure I
Cut Values as a Percent of Comparative Example B

| Example | 500 cycles | 1000 cycles | 1500 cycles | 2000 cycles |
|---------|------------|-------------|-------------|-------------|
| 3 | 92.5 | 100.6 | 105.7 | 110.9 |
| 4 | 91.9 | 98.4 | 103.1 | 107.7 |
| C | 72.6 | 79.1 | 83.1 | 87.5 |
| E | 68.4 | 75.7 | 80.2 | 84.8 |
| G | 71.8 | 79.7 | 84.5 | 89.6 |
| B | 100.0 | 100.0 | 100.0 | 100.0 |

TABLE 6

Disc Test Procedure I
Surface Finish Data

| Example | 500 cycles | | 2000 cycles | |
|---------|-----|-----|-----|-----|
| | Ra | Rz | Ra | Rz |
| 3 | 23.7 | 172 | 20 | 146 |
| 4 | 23.3 | 170 | 21 | 148 |
| C | 22.3 | 162 | 18 | 137 |
| E | 20.0 | 150 | 18 | 140 |
| G | 20.3 | 147 | 17 | 123 |
| B | 25.7 | 179 | 20 | 142 |

TABLE 7

Disc Test Procedure II
Cut Values an a Percent of Comparative Example B

| Example | 500 cycles | 1000 cycles |
|---------|------------|-------------|
| 3 | 84.2 | 108.9 |
| 4 | 102.0 | 132.3 |
| C | 108.7 | 135.8 |
| E | 97.0 | 115.7 |
| G | 97.8 | 128.4 |
| B | 100.0 | 100.0 |

TABLE 8

Test Procedure III
Cut Values an a Percent of Comparative Example B

| Example | Cut | Ra | Rz |
|---------|-----|-----|-----|
| 3 | 72.7 | 118.0 | 550.0 |
| 4 | 95.7 | 35.7 | 239.0 |
| C | 52.8 | — | — |
| E | 71.0 | 27.0 | 203.0 |
| G | 72.3 | 35.7 | 252.0 |
| B | 100.0 | 38.0 | 249.0 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of making an abrasive composite wherein the composite comprises abrasive particles dispersed in a binder, wherein the binder is comprised of an addition polymerized resin having clay particles dispersed therein, the method comprising the steps of forming a slurry comprising abrasive particles, an addition polymerizable resin, and clay particles, and exposing the slurry to conditions sufficient to cure the addition polymerizable resin.

2. A method in accordance with claim 1 wherein said addition polymerizable resin is selected from the group consisting of ethylenically unsaturated resins and epoxy resins.

3. A method in accordance with claim 2 wherein said ethylenically unsaturated resin is selected from the group consisting of acrylated urethane resins, styrene, divinylbenzene, vinyl toluene, aminoplast resins having pendant unsaturated carbonyl groups, isocyanurate resins having at least one pendant acrylate group, and isocyanate resins having at least one pendant acrylate group.

4. A method in accordance with claim 3, wherein said isocyanurate resin is the combination of the triacrylate of tris(hydroxyethyl)isocyanurate and trimethylol propane triacrylate.

5. A method of making an abrasive article comprising the steps of:
   1) coating a slurry onto a production tool having a three dimensional pattern, the slurry comprising an addition polymerizable resin, abrasive particles, and clay particles;
   2) contacting a substrate having at least one major surface with the slurry so that the slurry wets said at least one major surface of the substrate, thus forming a first intermediate article;
   3) exposing the slurry to conditions sufficient to at least partially cure the addition polymerizable resin to form a second intermediate article; and
   4) removing the second intermediate article from the production tool, yielding an abrasive article.

6. A method in accordance with claim 5 wherein said exposing step comprises exposing the slurry to radiation energy.

7. A method of making an abrasive article comprising the steps of:

1) contacting a substrate having at least one major surface with a slurry such that the slurry wets said at least one surface to form a first intermediate article, the slurry comprising an addition polymerizable resin, abrasive particles, and clay particles;
2) contacting the slurry of the first intermediate article to a production tool having a three dimensional pattern;
3) exposing the slurry to conditions sufficient to at least partially cure the addition polymerizable resin to form a second intermediate article; and
4) removing the second intermediate article from the production tool, yielding an abrasive article.

8. A method in accordance with claim 7 wherein said exposing step comprises exposing the slurry to radiation energy.

* * * * *